US006985911B2

(12) United States Patent
Doole et al.

(10) Patent No.: US 6,985,911 B2
(45) Date of Patent: Jan. 10, 2006

(54) MECHANISM FOR INVOCATION OF USER-DEFINED ROUTINES IN A MULTI-THREADED DATABASE ENVIRONMENT

(75) Inventors: Douglas J. Doole, Don Mills (CA); Sean W. McKeough, Markham (CA); Timothy J. Vincent, Toronto (CA); George M. Wilson, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 479 days.

(21) Appl. No.: 10/211,392

(22) Filed: Aug. 1, 2002

(65) Prior Publication Data

US 2003/0115178 A1    Jun. 19, 2003

(30) Foreign Application Priority Data

Dec. 19, 2001   (CA) .................................. 2365687

(51) Int. Cl.
*G06F 17/30*   (2006.01)
(52) U.S. Cl. ................................ 707/103 R
(58) Field of Classification Search ............. 707/1–10, 707/100–104.1; 709/203, 219, 310, 315; 718/104
See application file for complete search history.

(56) References Cited

U.S. PATENT DOCUMENTS

| 5,049,800 | A |   | 9/1991  | Kohari et al. .............. 318/771 |
| 5,724,564 | A |   | 3/1998  | Conder et al. ............... 72/234 |
| 5,742,564 | A |   | 4/1998  | Kuschel et al. .............. 368/69 |
| 5,987,245 | A | * | 11/1999 | Gish ........................... 719/310 |
| 5,987,463 | A |   | 11/1999 | Draaijer et al. .............. 707/10 |
| 5,999,972 | A | * | 12/1999 | Gish ........................... 709/219 |
| 6,049,800 | A |   | 4/2000  | Govindarajan et al. ....... 707/10 |
| 6,098,090 | A |   | 8/2000  | Burns .......................... 718/107 |
| 6,112,210 | A | * | 8/2000  | Nori et al. .............. 707/103 R |
| 6,233,620 | B1 | * | 5/2001  | Gish ........................... 709/203 |
| 6,424,991 | B1 | * | 7/2002  | Gish ........................... 709/203 |
| 6,434,598 | B1 | * | 8/2002  | Gish ........................... 709/203 |
| 6,604,125 | B1 | * | 8/2003  | Belkin ......................... 718/104 |
| 6,714,928 | B1 | * | 3/2004  | Calow ........................... 707/4 |
| 6,832,228 | B1 | * | 12/2004 | Nock ..................... 707/103 R |
| 2003/0191867 | A1 | * | 10/2003 | Czajkowski ................ 709/315 |

OTHER PUBLICATIONS

Richard a. Kilgore, Open-source SML and Silk for Java-based, object-oriented simulation, 2001, IEEE Computer Society, Proc of the 33rd Confer. on Winter simuation, pp. 262-268.*

(Continued)

*Primary Examiner*—Diane Mizrahi
(74) *Attorney, Agent, or Firm*—Sawyer Law Group LLP

(57) ABSTRACT

A database management system provides for the execution of invokable user-defined routines. Applications specify user-defined routines as being threadsafe or not threadsafe and specify the language of user-defined routines. Execution of routines will be carried out dependent on the threadsafe characteristic of the routines and on the language of the routines. Routines are assigned to processes based on their language to have any given process execute routines of the same language. Routines that are specified to be threadsafe are executed in threads in a potentially multi-threaded process. Each routine that is specified to be not threadsafe is executed in a fenced-mode processes in which no other routine is being executed.

3 Claims, 1 Drawing Sheet

OTHER PUBLICATIONS

Sameer Shenda et al., Integration and applications of the TAU performance system in parallel Java environments, 2001, Proc. of the 2001 joint ACM-ISCOPE confer. on Java Grande, pp. 87-96.*

Xu, Xiaoyi et al., Configuring buffer pools in DB2 UDB, 2002, IBM Centre for Advancement Studies Conference, Pro. of the 200 conf. for advanced studies on collaborative research, IBM Press, pp. 1-13.*

* cited by examiner

MECHANISM FOR INVOCATION OF USER-DEFINED ROUTINES IN A MULTI-THREADED DATABASE ENVIRONMENT

FIELD OF THE INVENTION

The present invention relates generally to computing systems and in particular to a mechanism for the invocation by a database system of user-defined routines in a multi-threaded environment.

BACKGROUND OF THE INVENTION

Database management systems provide for stored procedures or user defined functions (user-defined stored routines) to be invoked from applications using the database systems. Typically, an application will use the database system to invoke a routine during a defined transaction. In database management systems such as the DB2 UDB J product, when a user-defined routine is invoked a separate process is launched by the database system to execute the routine. The isolation of execution of user-defined routines in processes separate from the database system itself prevents memory corruption or traps in user-written routines from affecting the database engine. There is also a separation between different user-defined routines that will prevent an erroneously coded user-defined routine from adversely affecting another.

There is a potentially high cost in system resources, however, that is associated with launching a new process for each user-defined routine that is invoked by the database system. This is particularly true for Java language stored procedures where a significant amount of memory is consumed by the presence of a Java virtual machine in each process, which is required to execute the Java code for the user-defined routine.

Another approach used in database systems such as DB2 UDB J is to generally restrict users from invoking stored routines from other stored routines (in some cases, such systems may make exceptions for a routine written in one of a defined set of languages). This restriction will prevent a user routine written in a language that limits the ability to erroneously effect another routine (Java language routines are considered "safe" in this way) from calling a routine that does not contain such built in limits (as, for example, the C language does not). The restriction will also prevent routines from being recursively called where the routine is not properly defined to be re-entrant.

It is therefore desirable to provide a mechanism to permit the invocation of stored routines that isolates potentially damaging routines from other routines without requiring a new process for every such invocation. It is also desirable to provide a mechanism that permits recursive invocation of stored routines without requiring restrictions based on the languages in which the routines were written.

The present invention addresses such a need.

SUMMARY OF THE INVENTION

According to an aspect of the present invention a system and method is provided for the invocation of user-defined routines in a database management system. The system and method comprise receiving a request from an application to invoke a user-defined routine in the set of user-defined routines and determining whether the user-defined routine is threadsafe and determining the routine language of the user-defined routine. The system and method includes providing a single threaded fenced mode process for execution of the user defined routine if the user defined routine is determined not to be threadsafe; and providing a multi-threaded fence mode process for execution of the user-defined routine if the user defined routine is determined to be threadsafe.

A database management system in accordance with the present invention provides for the execution of invokable user-defined routines. Applications specify user-defined routines as being threadsafe or not threadsafe and specify the language of user-defined routines. Execution of routines will be carried out dependent on the threadsafe characteristic of the routines and on the language of the routines. Routines are assigned to processes based on their language to have any given process execute routines of the same language. Routines that are specified to be threadsafe are executed in threads in a potentially multi-threaded process. Each routine that is specified to be not threadsafe is executed in a fenced-mode processes in which no other routine is being executed.

Advantages of the invention include a system that permits user-defined routines to be called with a lower system overhead than otherwise.

DETAILED DESCRIPTION

Figure 1:
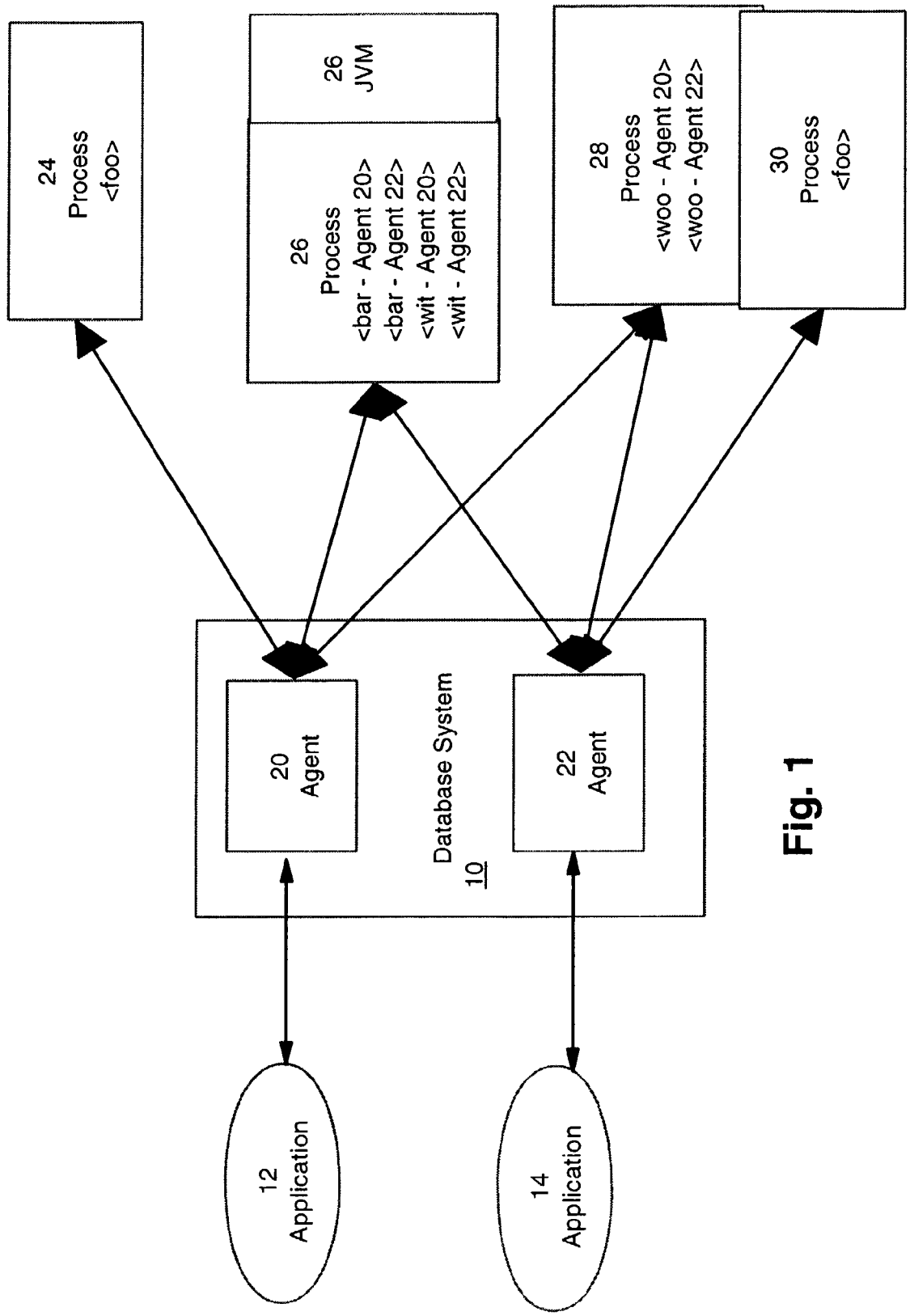
FIG. 1 is a block diagram showing an example in which user defined routines are invoked using the mechanism of the preferred embodiment.

The present invention relates generally to computing systems and in particular to a mechanism for the invocation by a database system of user-defined routines in a multi-threaded environment. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

In FIG. 1, a block diagram illustrates the invocation of user-defined routines using the mechanism of the preferred embodiment. FIG. 1 shows database system 10 being accessed by applications 12, 14. In the example of FIG. 1, database system 10 associates agents 20, 22 with applications 12, 14 respectively. The example shows processes 24, 26, 28, 30. Each of these is a fenced mode process and therefore runs in its own memory space. Processes 26, 28 are multi-threaded processes. The example shows applications 12, 14 each executing, via database system 10, user-defined stored routines named bar, foo, wit and woo. The manner in which these routines are executed is described in more detail below.

In the preferred embodiment, the invocation of a user-defined routine will not necessarily result in a new process being spawned. Instead, subject to the exceptions set out below, invoking a user-defined routine will result in the routine being run in a multi-threaded mode within a process that may contain other threads executing other routines with like attributes such as language.

As will be appreciated, permitting different user-defined routines to be run in the same process includes a degree of risk that the execution of one routine in the process (a routine that contains errors) will interfere with the execution of the other routines. To reduce the likelihood of routines affecting each other in this undesirable way, the preferred embodiment provides for users to specify that a routine may pose such a risk. In the preferred embodiment, each user-defined routine is designated as being THREADSAFE or NOT THREADSAFE. Routines that are not re-entrant are considered NOT THREADSAFE as such routines affect global variables and will therefore cause potential unwanted outcomes for other routines run in the same process.

If a routine is defined to be THREADSAFE, the routine is considered to have a limited likelihood of adversely affecting other routines. Conversely, a routine that is defined to be NOT THREADSAFE will be flagged by the preferred embodiment to potentially pose a risk if it is run in the same process as another routine. In the preferred embodiment, a routine that is indicated to be NOT THREADSAFE will be run in its own fenced mode process to prevent the routine from detrimentally affecting other routines and from making undesirable changes to global variables.

An application may therefore define a routine as being NOT THREADSAFE when the routine is written in a language that is more likely to give rise to routines causing memory corruption or traps. This may be the case, for example, where the routine is written in the C programming language or where the routine is from an unknown source. Similarly, an application may define a routine to be NOT THREADSAFE where the routine is from a source that is not sufficiently trustworthy.

The syntax used in an application to define a routine as NOT THREADSAFE is shown by the following example from the preferred embodiment in which the C language procedure "foo" is defined to be NOT THREADSAFE:

CREATE PROC FOO
LANGUAGE C
NOT THREADSAFE

In the preferred embodiment, different language routines have different associated default THREADSAFE values. For example, a C language routine is defined by default to be NOT THREADSAFE, whereas a Java language or SQL language routine is defined to be THREADSAFE, unless user-specified to be otherwise.

The preferred embodiment also provides another feature to lessen the risk that a user-defined routine will adversely affect another such routine. The system of the preferred embodiment segregates THREADSAFE user-defined routines of the same language within a single fenced mode process. For example, all THREADSAFE Java stored procedures are run in a single fenced mode process (and thus share the same JVM).

As will be appreciated from the above description, when a routine is classified as being unsafe by the preferred embodiment (either by a user-specified designation or by a default designation), the routine will be run in its own fenced mode process. Otherwise the routine will be run as a thread in a process that may potentially run other routines of the same language.

FIG. 1 illustrates the mechanism of the preferred embodiment by way of example. In FIG. 1, each of applications 12, 14 are shown accessing each of user defined routines bar, foo, wit and woo. Bar and wit are defined in the Java language and are considered THREADSAFE. Foo is defined in the C language to be NOT THREADSAFE, whereas woo is defined in C but is specified as being THREADSAFE.

The manner in which each of these user-defined routines is executed is illustrated by processes 24, 26, 28, 30 shown in FIG. 1. Process 26 shows the two Java language user-defined routines bar and wit, each having been invoked by applications 12, 14. As shown in FIG. 1, the invocation of each routine results in execution of the routine by a thread in the process 26. In the example of FIG. 1, process 26 has a thread for each agent's invocation of the routine "bar" and a thread for each agent's invocation of routine "wit", both of which are user-defined Java language routines. A single Java Virtual Machine (shown by example as JVM 20 in FIG. 1) may be run by process 26 and shared by each of the threads in process 26. Although each agent is shown with a separate thread for execution of the Java routine (for example, <bar B Agent 20> and <bar B Agent 22> in FIG. 1), both threads use the same instantiation of the stored routine from the stored procedure library (stored procedure bar, in the example). In this way, the memory requirements for execution of user-defined routines are reduced. The number of separate JVMs that are required by the database system is reduced and the number of instantiations of routines is also potentially reduced for THREADSAFE routines.

FIG. 1 also illustrates the manner in which routine execution is isolated within a process where the routine is defined as NOT THREADSAFE. In FIG. 1, user-defined routine foo is specified as not being a safe routine. For this reason, there are separate processes 24, 30 launched as a result of agents 20, 22 seeking to execute C routine foo in response to requests made by applications 12, 14, respectively. In contrast, C routine woo is defined to be THREADSAFE in the example of FIG. 1. For this reason, process 28 is shown with two threads, one for execution of each of the two woo routines invoked by agents 20, 22.

As the example of FIG. 1 illustrates, the approach of the preferred embodiment provides that threadsafe routines will execute within a single process, where the language of the routines is the same. Therefore in FIG. 1, process 26 is shown executing the two Java language routines bar and wit while process 28 is shown with the THREADSAFE C language routine woo. If the C language routine foo had been defined as THREADSAFE, it too would have been executed within process 28. The specification of foo as NOT THREADSAFE, however, resulted in separate processes 24, 30 being spawned for execution of each invocation of the routine foo.

The approach of the preferred embodiment permits routines to be run without unnecessary overhead where the safety of the routines is known to be high. Where the routines are inherently risky or the safety cannot be determined, the routines are run in separate fenced mode processes to prevent unwanted errors.

The mechanism of the preferred embodiment permits protected invocation of a routine from a user-defined routine to be carried out without restrictions based on the languages of the routines. Restrictions that specified that a call from a user-defined routine would be allowed only where the called routine was of the same language as the calling routine are not required in the preferred embodiment. Recursion of routines is permitted using the mechanism of the preferred embodiment. For example, invocation by a safe routine of an unsafe routine followed by an invocation back to a safe routine will be handled by a separate process being used to execute the unsafe routine.

Using the mechanism of the preferred embodiment, the invocation of a routine will cause the routine to be run by a process that is specific to the language of the routine. By using the mechanism of the preferred embodiment, recursive invocation of routines will require less system resources due to the use of one process for the execution of multiple routines that are defined to be THREADSAFE. Because the safety of a routine is a characteristic that is defined for each routine that is invoked by the application, the invocation of a safe routine from an unsafe routine, or vice versa, will be handled efficiently and elegantly by the preferred embodiment. In this way, recursive mixed language routine invocation is supported in the database management system of the preferred embodiment. Previously, restrictions had been imposed on such calls due to the potential problems in having, for example, a Java routine call a C routine that would then call a Java routine. The system of the preferred embodiment, by reducing the required overhead inherent in the invocation of user-defined routines, permits this type of calling sequence to be used.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer implemented method for the execution of a set of invokable user-defined routines in a database management system, the method comprising:
   (a) receiving a request from an application to invoke a user-defined routine in the set of user-defined routines,
   (b) determining whether the user-defined routine is threadsafe,
   (c) in the case that the user-defined routine is determined not to be threadsafe, spawning a fenced-mode process to execute the user-defined routine,
   (d) in the case that the user-defined routine is determined to be threadsafe, where an existing process is available to the database system for execution of threadsafe routines, executing the user-defined routine in a thread in the existing process, and where there is no such existing process, spawning a new, multi-threaded, fenced-mode process and executing the user-defined routine in a thread in the said new process.

2. A computer implemented database management system comprising means for the execution of a set of invokable user-defined routines, comprising:
   means for receiving a request from an application to invoke a user-defined routine in the set of user-defined routines,
   means for determining whether the user-defined routine is threadsafe,
   means for spawning a fenced-mode process to execute the user-defined routine, in the case that the user-defined routine is determined not to be threadsafe,
   means for executing the user-defined routine in a thread in an existing process, where the user-defined routine is determined to be threadsafe, and the existing process is available to the database system, and
   means for spawning a new, multi-threaded, fenced-mode process for threadsafe and means for executing the user-defined routine in a thread in the said new process where there is no such existing process and where the user-defined routine is determined to be threadsafe.

3. A computer readable medium containing program instructions for the execution of a set of invokable user-defined routines in a database management system, the method comprising:
   (a) receiving a request from an application to invoke a user-defined routine in the set of user-defined routines,
   (b) determining whether the user-defined routine is threadsafe,
   (c) in the case that the user-defined routine is determined not to be threadsafe, spawning a fenced-mode process to execute the user-defined routine,
   (d) in the case that the user-defined routine is determined to be threadsafe, where an existing process is available to the database system for execution of threadsafe routines, executing the user-defined routine in a thread in the existing process, and where there is no such existing process, spawning a new, multi-threaded, fenced-mode process and executing the user-defined routine in a thread in the said new process.

* * * * *